US006664728B2

(12) United States Patent
Pavlovsky et al.

(10) Patent No.: US 6,664,728 B2
(45) Date of Patent: Dec. 16, 2003

(54) CARBON NANOTUBES WITH NITROGEN CONTENT

(75) Inventors: Igor Pavlovsky, Austin, TX (US); Richard Lee Fink, Austin, TX (US); Zvi Yaniv, Austin, TX (US)

(73) Assignee: Nano-Proprietary, Inc., Austin, TX (US)

( * ) Notice: Subject to any disclaimer, the term of this patent is extended or adjusted under 35 U.S.C. 154(b) by 24 days.

(21) Appl. No.: 09/957,627

(22) Filed: Sep. 20, 2001

(65) Prior Publication Data

US 2003/0197462 A1 Oct. 23, 2003

Related U.S. Application Data

(60) Provisional application No. 60/235,143, filed on Sep. 22, 2000.

(51) Int. Cl.[7] .............................. H01J 1/62; H01J 1/30
(52) U.S. Cl. ....................................... 313/495; 313/310
(58) Field of Search ................................. 313/310, 495, 313/311; 445/24

(56) References Cited

U.S. PATENT DOCUMENTS

| 3,866,077 | A |   | 2/1975  | Baker et al. |        |
|-----------|---|---|---------|--------------|--------|
| 4,272,699 | A |   | 6/1981  | Faubel et al.|        |
| 4,728,851 | A |   | 3/1988  | Lambe        |        |
| 5,773,921 | A |   | 6/1998  | Keesmann et al. |     |
| 5,853,310 | A | * | 12/1998 | Nishimura et al. | 445/24 |
| 6,042,445 | A | * | 3/2000  | Amrine et al. | 445/24 |
| 6,097,138 | A |   | 8/2000  | Nakamoto     |        |
| 6,239,547 | B1|   | 5/2001  | Uemura et al.|        |
| 6,265,466 | B1|   | 7/2001  | Glatkowski et al. |    |
| 6,359,383 | B1|   | 3/2002  | Chuang et al.|        |
| 6,380,671 | B1|   | 4/2002  | Lee          |        |
| 6,469,425 | B1| * | 10/2002 | Sakai et al. | 313/310 |

FOREIGN PATENT DOCUMENTS

| EP | 0 905 737 A1 | 3/1999  |
|----|--------------|---------|
| EP | 0 913 508 A2 | 5/1999  |
| EP | 0 951 047 A2 | 10/1999 |
| JP | 58-216327    | 2/1994  |
| JP | 10-050240    | 2/1998  |
| JP | 9-221309     | 6/1998  |
| JP | 10-199398    | 7/1998  |
| JP | 11-111161    | 4/1999  |
| JP | 11-135042    | 5/1999  |
| JP | 11-260244    | 9/1999  |
| JP | 11-260249    | 9/1999  |
| JP | 11-297245    | 10/1999 |
| JP | 11-329311    | 11/1999 |
| JP | 11-329312    | 11/1999 |
| WO | WO 98/21736  | 5/1998  |

OTHER PUBLICATIONS

A. N. Obraztsov et al. "Aligned carbon nanotube films for cold cathode applications," *J. Vac. Sci. Technol. B* vol. 18, No. 2, Mar./Apr. 2000, pp. 1059–1063.

Xueping Xu et al. "A method for fabricating large–area, patterned, carbon nanotube field emitters," *Applied Physics Letters*, vol. 74, No. 17, Apr. 1999, pp. 2549–2551.

(List continued on next page.)

*Primary Examiner*—Ashok Patel
*Assistant Examiner*—Glenn D. Zimmerman
(74) *Attorney, Agent, or Firm*—Kelly K. Kordzik; Winstead Sechrest & Minick P.C.

(57) ABSTRACT

Field emission characteristics of carbon films are improved by changing the conditions of the growth of the films, by adding nitrogen, or substitutes to the nitrogen for hydrogen, in the carbon film growth process. Resulting field emission cathodes exhibit better field emission characteristics because of the increased concentration of nitrogen within the film.

10 Claims, 6 Drawing Sheets

OTHER PUBLICATIONS

J. Li et al. "Highly-ordered carbon nanotube arrays for electronics applications," *Applied Physics Letters*, vol. 75, No. 3, Jul. 1999, pp. 367–369.

Masako Yudasaka et al. "Behavior of Ni in carbon nontube nucleation," *Applied Physics Letters*, vol. 70, No. 14, Apr. 1997, pp. 1817–1818.

L. Nilsson et al. "Scanning field emission from patterned carbon nanotubes films," *Applied Physics Letters*, vol. 76, No. 15, Apr. 2000, pp. 2071–2073.

Yan Chen et al. "Field emission of different oriented carbon nanotubes," *Applied Physics Letters*, vol. 76, No. 17, Apr. 2000, pp. 2469–2471.

V. I. Merkulov et al. "Patterned growth of individual and multiple vertically aligned carbon nanofibers," *Applied Physics Letters*, vol. 76, No. 24, Jun. 2000, pp. 3555–3557.

Shaoming Huang et al. "Patterned Growth and Contact Transfer of Well-Aligned Carbon Nanotubes Films," *J. Phys. Chem. B*, vol. 103, Jan. 1999, pp. 4223–4227.

Hiroki Ago et al. "Dispersion of metal nanoparticles for aligned carbon nanotubes arrays," *Applied Physics Letters*, vol. 77, No. 1, Jul. 2000, pp. 79–81.

Philip G. Collins et al. "A simple and robust electron beam source from carbon nanotubes," *Applied Physics Letters*, vol. 69, No. 13, Sep. 1996, 3 pgs.

Sashiro Uemura et al. *"Invited Paper:* High-Luminance Carbon Nanotube FED," *SID International Symposium*, First Edition, May 2000, pp. 320–323.

Satoru Suzuki et al. "Work functions and valence band states of pristine and Cs-intercalated single-walled carbon nanotubes bundles," *Applied Physics Letters*, vol. 76, No. 26, Jun. 2000, pp. 4007–4009.

\* cited by examiner

CARBON NANOTUBES WITH NITROGEN CONTENT

CROSS-REFERENCE TO RELATED APPLICATION

This application claims priority to U.S. Provisional Patent Application Serial No. 60/235,143, filed Sep. 22, 2000.

TECHNICAL FIELD

The present invention relates in general to field emission devices, and in particular, to field emission devices utilizing carbon nanotubes.

BACKGROUND INFORMATION

Carbon nanotubes/nanofibers have attracted much interest because of their unique physical properties and many potential applications. One significant application is as field-emission electron sources. These sources can find themselves imbedded in other applications such as displays, x-ray sources, microwave devices, satellite thrusters, etc. Carbon nanotubes were first discovered by Iijima, (see S. Iijima, Nature (London) Vol. 354, p. 56, 1991 which is hereby incorporated by reference herein). Since then, many have developed several methods of fabricating the material. For field emission source applications, the state of the art is to either fabricate the tubes in a reactor and then place them on a substrate surface, (see Sashiro Uemura, Junko Yotani, Takeshi Hagasako, Yahachi Saito and Motoo Yumura, "High-Luminance Carbon Nanotube FED", SID 2000 Digest of Technical Papers, p. 320 (2000); and P. G. Collins and A. Zettl, Appl. Phys. Lett., Vol. 69, p. 1969 (1996)) or grow them directly onto the substrate surface. The latter method is generally preferred since the field emission properties of the resulting film are not degraded by the presence of binders and adhesives to secure the carbon nanotubes to the substrate.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

It has been learned that adhesive metal layers such as Ti and/or TiW are needed to adhere the carbon film to the substrate. Since then it has been found that some films are better emitters than other films. In understanding what are the properties of a good field emitting carbon nanotube/nanofiber film, it has been discovered that the presence of nitrogen gas introduced at a step during the growth process improves the results. These films were analyzed using Secondary Ion Mass Spectroscopy (SIMS).

Description of the SIMS Technique

A sample was submitted for dynamic SIMS analysis. The sample consisted of a carbon layer on Ni metal on Ti metal on Ti/W alloy metal on glass. The purpose of this analysis was to obtain a nitrogen (N) depth profile in the carbon layer and to obtain aluminum (Al), silicon (Si), titanium (Ti) and nickel (Ni) depth profiles in the carbon layer.

Dynamic SIMS is a technique used to acquire concentration depth profiles. In the SIMS technique, an ion beam is used to sputter material from the sample. The sputtered material consists of ions and neutral atoms. The ions are electrostatically directed into a mass analyzer. The mass analyzer selectively allows the desired ions to reach the detector. As the primary ion beam sputters into the sample, material from the current depth reaches the detector. Thus, the concentration of a particular element may be monitored at different depths. During the analysis, the primary beam is rastered to create a flat-bottomed crater. Secondary ions are acquired only from the center of the crater. This ensures that each data point comes from a unique depth by rejecting secondary ions emitted from the wall of the sputtered crater where material at different depths is simultaneously exposed. The secondary ion signal intensity as a function of time is converted to a concentration depth profile using relative sensitivity factors and calculated sputter rates.

| Instrument Conditions Used | |
|---|---|
| | Condition 1 |
| Instrument | Cameca SIMS (Magnetic Sector) |
| Elements Monitored | N, Al, Si, Ti, Ni, C |
| Primary Impact Beam | $Cs^+$ |
| Primary Impact Energy | 14.5 keV |
| Angle of Incidence | 24° |
| Secondary Ion Polarity | Negative |
| Oxygen Leak | No |
| Charge Neutralization | No |
| Surface Conductive Coating | Yes |

Results of the full page processed depth profiles, in concentration (atoms/cm$^3$) as a function of depth, are illustrated in the Figures.

Nitrogen, aluminum, silicon, titanium and nickel have been quantified and are plotted referenced to the concentration scale (atoms/cm$^3$) on the left side of the processed data plot. Quantification is valid only in the carbon portion of the profile. Nitrogen does not readily form a secondary ion and is measured as a molecular ion composed of nitrogen and a matrix species ($^{14}N+^{12}C$). High mass resolution conditions were utilized to separate $^{14}N+^{12}C$ from the $^{13}C_2$ and $^{12}C_2+$ $^1H_2$ molecular ion interferences, which occur at the same nominal mass. The same high mass resolution conditions were utilized to analyze for the other elements of interest. These conditions were necessary to eliminate various molecular ion interferences that occur at the same nominal mass for each of the elements. The elements were divided into two groups so that an adequate number of data points could be acquired in the carbon layer. A molecular ion of carbon was also monitored during the depth profiles for purposes of layer identification. This ion has not been quantified but is plotted referenced to the secondary ion count scale on the right side of the data plot.

Figure 1:
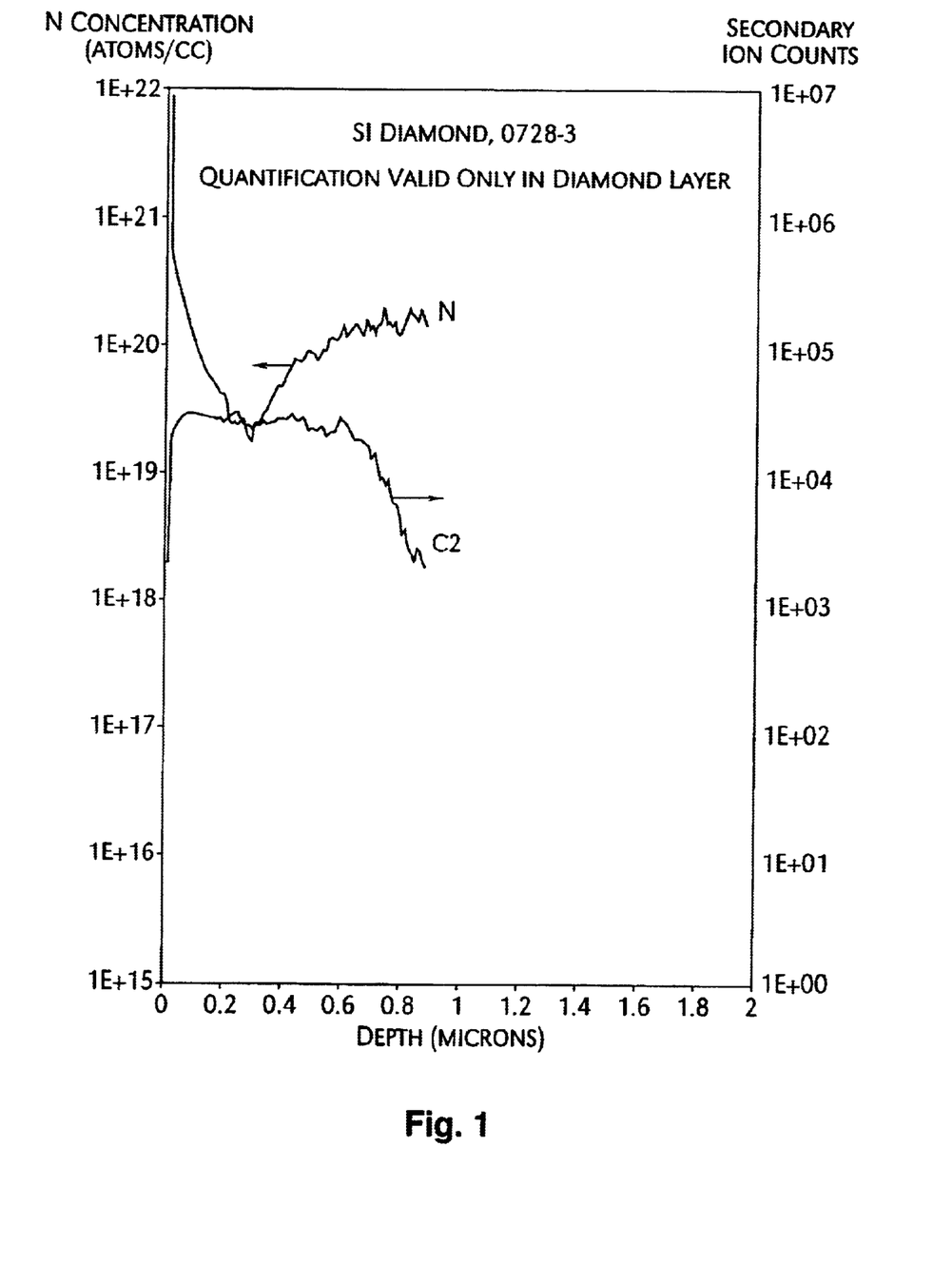
FIGS. 1–3 illustrate processed depth profiles of a sample of a field emission device in accordance with the present invention.

FIG. 1 illustrates a concentration of nitrogen (N) as a function of depth (see subsequent discussion of Depth Calibration). Nitrogen concentration is plotted referenced to the concentration scale (atoms/cm$^3$) on the left side of the processed data plot. The carbon signal is in secondary ion counts and is read on the right side of the data plot. What is seen in this plot is carbon secondary ion count remaining constant until about a "depth" of 0.6 microns. The nitrogen concentration starts as a concentration of about $2-5 \times 10^{20}$ atoms/cc, falls to about $2 \times 10^{19}$ atoms/cc, then increases back up. (The data in the first 0.02 microns should be ignored as the machine stabilizes.) FIG. 1 further illustrates that nitrogen exists in the carbon film throughout, from the beginning to the surface of the carbon film in a concentration of at least $10^{19}$ atom/cc. In FIG. 1, the statement "qualification valid only in diamond layer" means that the etching process of material to free all the other constituents is done with the reference to a diamond layer. As is known, a diamond layer is much more dense and compactly arranged, and it is one of the most difficult to etch. If it is assumed that the carbon nanotube layer is as difficult to etch as a diamond layer, then the quantification of nitrogen is the same, meaning $10^{19}$ atom/cc. Since it is believed that carbon nanotubes or carbon films etch faster than diamond, in the test, more carbon material was etched then the reference in diamond film, meaning that the real concentration of nitrogen in the sample with respect to the carbon films is lower than $10^{19}$ atom/cc. Therefore, it is extrapolated that the nitrogen concentration for good electron field emission is at least $10^{17}$ atom/cc.

Figure 2:
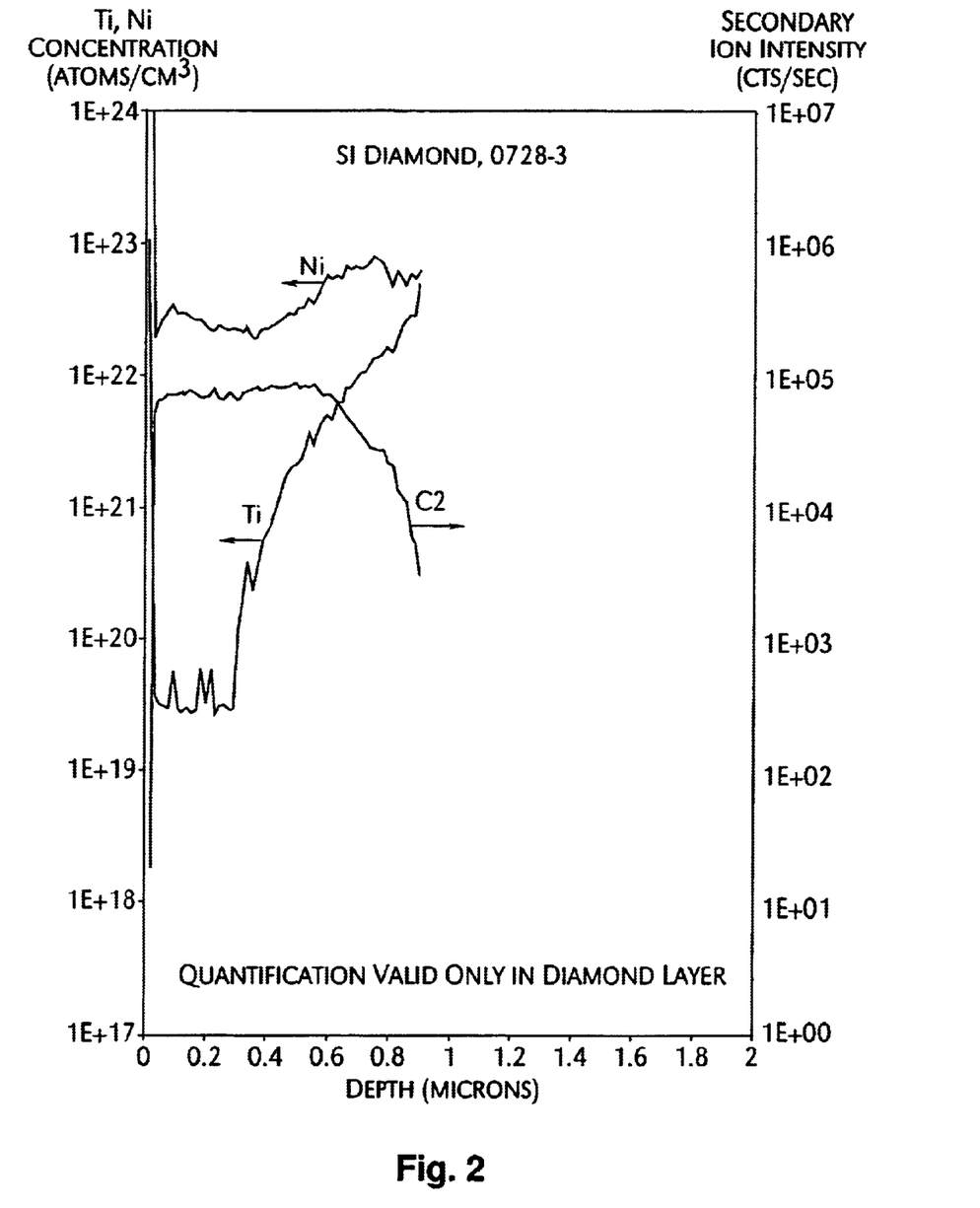

FIG. 2 illustrates that the increase in nitrogen concentration mid-way through the depth is correlated with the increase in the titanium signal. Thus, both the carbon layer and the titanium layer actually contain significant amounts of nitrogen.

FIG. 2 illustrates concentration of nickel (Ni) and titanium (Ti) as a function of depth (see subsequent discussion of Depth Calibration). Nickel and titanium concentrations are plotted referenced to the concentration scale (atoms/cm$^3$) on the left side of the processed data plot. The carbon signal is in secondary ion counts and is read on the right side of the data plot. Nickel concentration remains fairly constant through the carbon layer, increasing slightly as the carbon film is being etched away. This means that some of the nickel is taken up in the carbon film. Nickel balls are at the ends of the carbon nanotubes as well as at the base of the carbon nanotubes. (See FIG. 1 of V. I. Merkulov, D. H. Lowndes, Y. Y. Wei and G. Eres, "Patterned growth of individual and multiple vertically aligned carbon nanofibers", Appl. Phys. Lett., Vol. 76, No. 24, p. 3555, Jun. 12, 2000; and also FIG. 3 and text of Yan Chan, David T. Shaw and Liping Guo, "Field emission of different oriented carbon nanotubes", App. Phys. Lett., Vol. 76, No. 17, p. 2469, Apr. 24, 2000; Masako Yadasaka, Rie Kikuchi, Yoshimasa Ohki, Etwuro Ota and Susumu Yoshimura, "Behavior of Ni in carbon nanotube nucleation", Appl. Phys. Lett., Vol. 70 (141) p. 1817, Apr. 7, 1997). The titanium concentration begins to increase significantly at a "depth" of 0.3 microns in the carbon, meaning that the carbon film at this depth is porous enough that the etching beam is starting to etch the substrate under the carbon film. This same behavior is also seen for Si and Al, which are major constituents of the glass substrate (Alumina Borosilicate, Corning 1737F glass).

Figure 3:
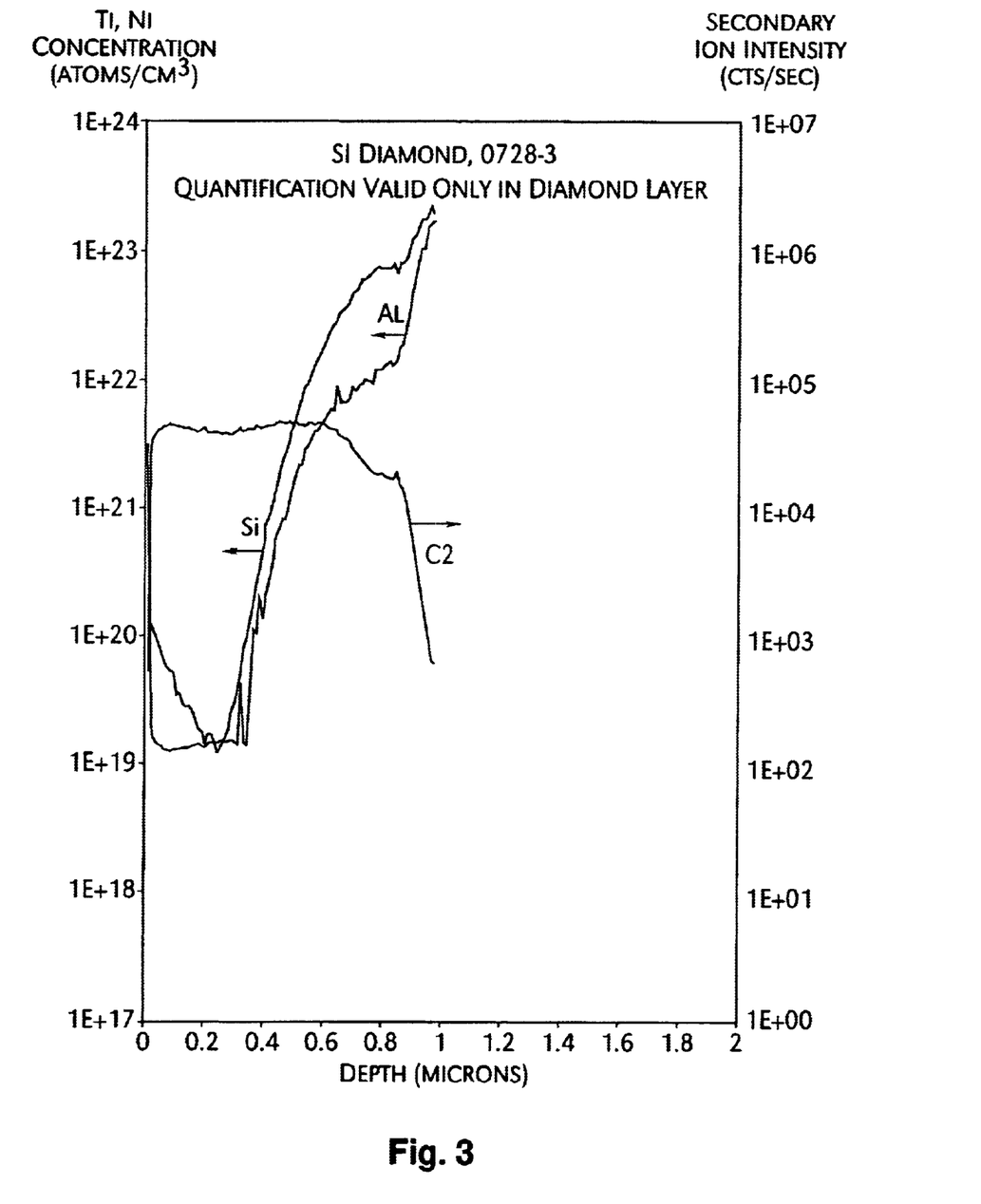

FIG. 3 illustrates concentration of silicon (Si) and aluminum (Al) as a function of depth (see subsequent discussion of Depth Calibration). Silicon and aluminum concentrations are plotted referenced to the concentration scale (atoms/cm$^3$) on the left side of the processed data plot. The carbon signal is in secondary ion counts and is read on the right side of the data plot. The silicon and titanium signal starts to increase significantly at a "depth" of between 0.3 and 0.4 microns.

These results are of good field emitting samples of catalytically grown carbon nanotube samples on glass substrates.

The instrumental background for nitrogen in diamond is approximately $2 \times 10^{18}$ atoms/cc. The nitrogen concentration in the unknown sample is above this detection limit and should be considered real. The detection limits for aluminum and titanium are count rate limited at approximately $2 \times 10^{19}$ atoms/cc. No detection limit for silicon and nickel can be estimated. These signal intensities are not count rate limited and should be considered real.

The conversion of measured secondary ion counts to concentration is performed using relative sensitivity factors (RSF's). Dynamic SIMS RSF values are matrix specific, and in this case, a similar matrix was assumed. The absolute accuracy of a SIMS measurement is based on the accuracy of the standard. For archival RSF's, the absolute accuracy should be within a factor of two. The precision or sample to sample variation is based on the analysis conditions, element monitored and sample matrix. The routine analysis precision is typically 10%. Note that this level of precision applies to parameters calculated from reasonably high signals (signal/noise>100). For weaker signals, measurement precision will tend to be limited by counting statistics and may approach a factor of>2 for quantities derived from signals near instrumental background levels or detector dark current levels. Using a high precision analysis protocol, a precision of better than 2% can be achieved on measurements of implant dose determination for sufficiently large doses. The quantification standard and instrument conditions utilized for these analyses have been tabulated below.

| Quantification Method and Instrument Condition Used | | |
|---|---|---|
| Element | Quantification Method | Accuracy of Standard / Instrument Condition |
| N | $^{15}$N in FEPET, Implant Reference CEA STD # IM1 | iii / 1 |
| Al, Si, Ti, Ni | Archival RSF's | iv / 1 |

Quantitative accuracy:
(iii) Reference Material ± 10–20% (one sigma)
(iv) Archival RSF's vary with the element monitored Depth Calibration The depth scales were based on a sputter rate calculated from the depth of the analytical crater and the total sputter time from the implant standard. The crater depths were determined from stylus profilometry using a Tencor Instruments, Alpha-Step 200. The accuracy of the depth calibration should be within ±3–5% (one sigma). The implanted standard was a sample of hard diamond that was implanted with nitrogen. Even though diamond is a carbon material, it is much different than the carbon nanotubes. Diamond is a very hard and dense material. Carbon nanotube films consist of a matt of fibers that has only a fraction of the density of the diamond material. Thus, when the Figures show that carbon starts to deplete at a depth of 0.6 microns, this is actually that depth one would achieve in an implanted diamond sample etched for the same amount of time for the same conditions. The depth in the carbon nanotube sample can actually be 5 times this amount. What is important in reading these graphs is not the absolute value of the depth, but how the different material concentrations behave relative to one another at the same depth in the sample.

Detection Limits

The detection limits for the species monitored are tabulated below. Please note that these detection limits are dependent on the instrumental conditions utilized. In certain applications, improved detection limits may be obtained using bulk analytical protocols by compromising depth resolution.

Detection Limits for this Analysis (atoms/cm$^3$)

| Element | Diamond Layer (Inst. Cond. 1) |
| --- | --- |
| Al | $2 \times 10^{19}$ (CRL) |
| Ti | $2 \times 10^{19}$ (CRL) |
| N | $1 \times 10^{18}$ (BKGD) |

Note: Detection limits may be either count rate limited (CRL) or background level limited (BKGD).

Reading the Concentration Scale

Typically, for trace level impurities the secondary ion signal intensity is linearly related to the concentration. The factor to convert the secondary ion signal intensity to concentration is derived from the analysis of reference samples with the same matrix as the unknown sample. If no reference standards are available, quantification is derived from the quantification parameters of a related matrix.

For multiple matrix samples, the secondary ion signal intensity from the sample is based on the concentration of the impurity as well as the matrix at that point in the depth profile. Thus, for samples with different layers, the quantification may change from layer to layer. In most of the plots the quantification is valid for the major layer of interest. However, a sample to sample comparison remains valid for all layers with the same matrix composition. The precision or the sample to sample variation of concentration measurement of the SIMS analysis is typically 10 percent. The precision is dependent on the impurity matrix combination and the analysis protocol.

The absolute accuracy of the SIMS analysis is based on the accuracy of the reference standard used for quantification. Our reference standard for nitrogen in carbon is ion-implanted nitrogen in diamond whose absolute accuracy is typically within 10%. Where no reference standards are available, the accuracy of quantification derived from a related matrix is typically accurate to within an order of magnitude.

Good field emitting carbon nanotube samples contain a significant amount of nitrogen in the film. Nitrogen concentration levels of $2\times10^{19}$ atoms/cc and above are detected in such films.

Nitrogen concentration levels are a key element in identifying carbon nanotube samples with good emission qualities (capable of emitting at least 40 mA/cm$^2$ at a field of less than 7 V/micron).

Figure 4:
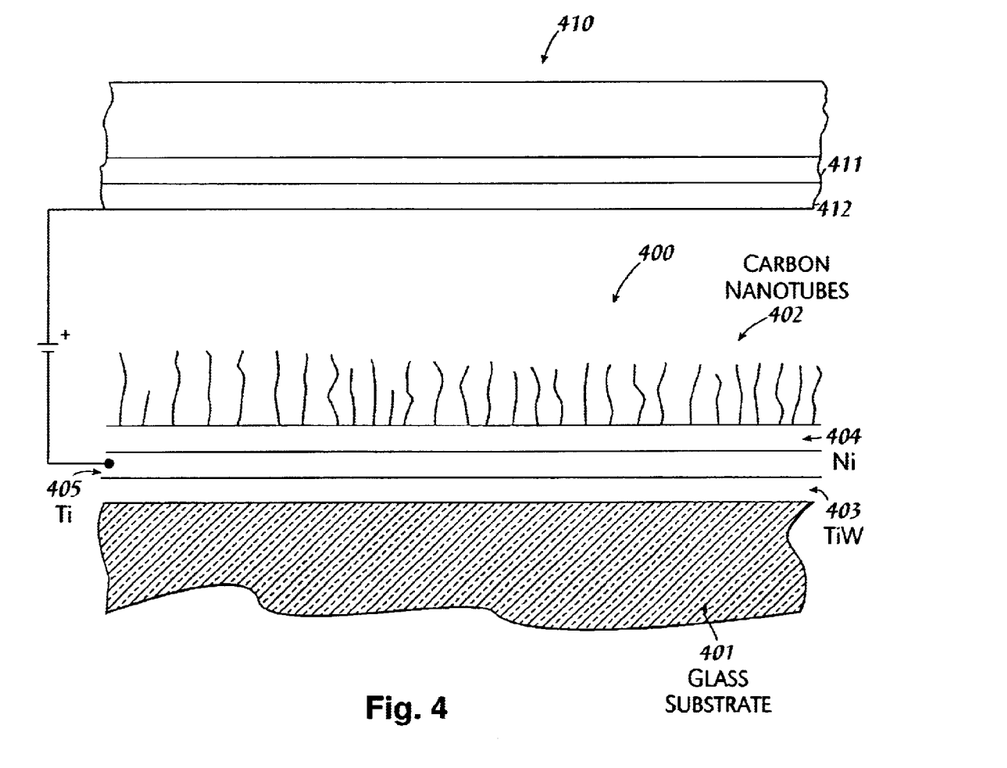
FIG. 4 illustrates a cross-section diagram of a field emission device configured in accordance with the present invention.

FIG. 4 illustrates a cross-section of a portion of a cathode 400 manufactured in accordance with the process described above where a layer of TIW 403 is deposited on a glass substrate 401, a layer of Ti 405 is deposited thereon, with a nickel (Ni) layer 404 on top thereon, and carbon nanotubes 402 deposited after that. When a proper electric field is established with respect to the cathode 400 illustrated in FIG. 4, the nanotubes 402 will emit electrons to an anode 410 having a phosphor layer 411 and conductor 412 thereon for emitting photons in response to the bombardment of electrons. Such a cathode 400 and anode 410 can then be used to manufacture a flat panel display device, or some other type of field emission display, such as for use in the data processing system illustrated in FIG. 5, which may comprise a computer system, or any other type of electronic system for displaying images on display device 538.

Figure 5:
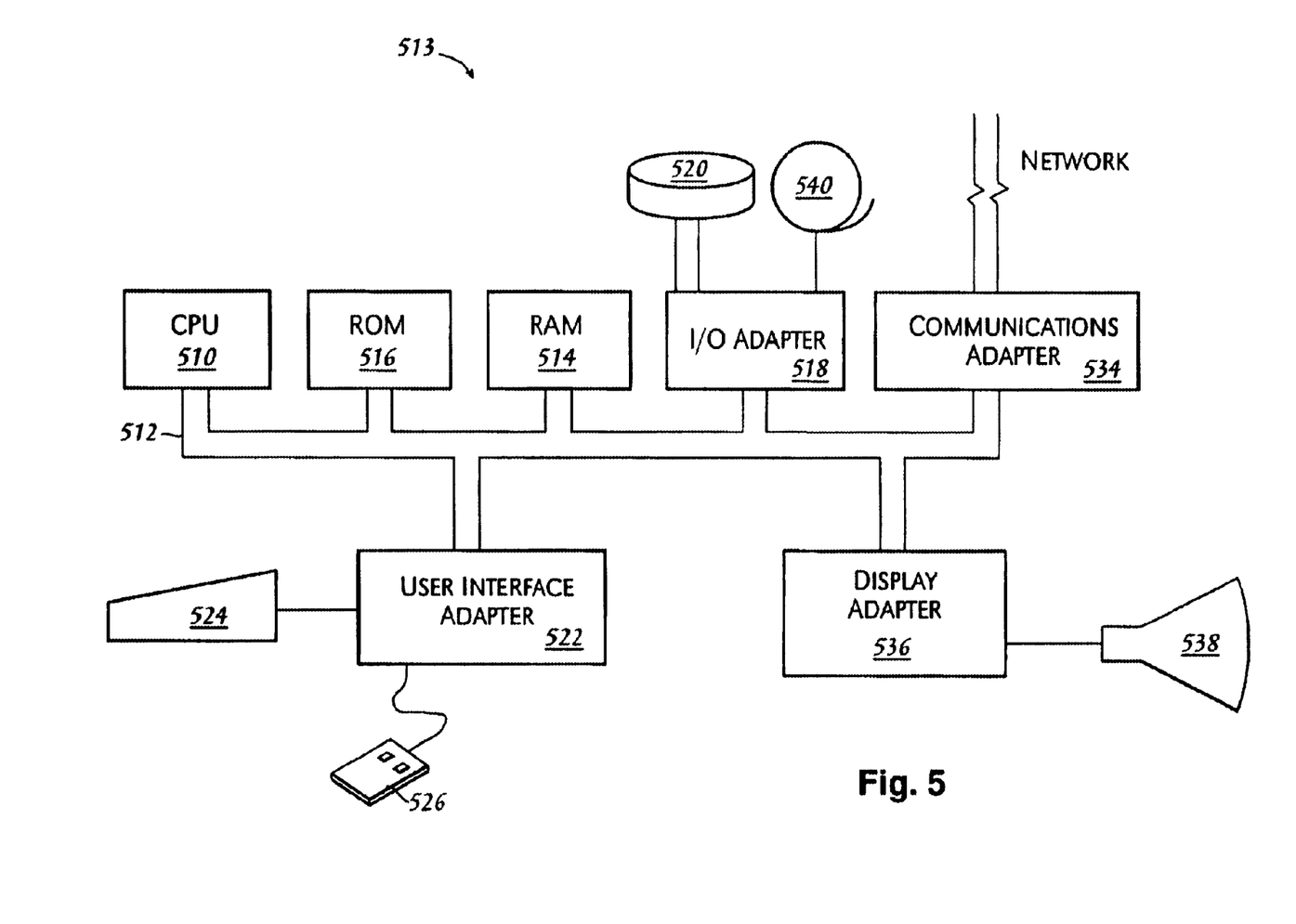
FIG. 5 illustrates a data processing system configured in accordance with the present invention.

A representative hardware environment for practicing the present invention is depicted in FIG. 5, which illustrates a typical hardware configuration of data processing system 513 in accordance with the subject invention having central processing unit (CPU) 510, such as a conventional microprocessor, and a number of other units interconnected via system bus 512. Data processing system 513 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, and/or other user interface devices such as a touch screen device (not shown) to bus 512, communication adapter 534 for connecting data processing system 513 to a data processing network, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. Alternatively, cathode 400 could be used in an x-ray device, a microwave device, satellite thruster, etc.

The present invention provides the means of improvement of field emission characteristics of carbon films by changing the conditions of the growth of the said films. More specifically, as nitrogen is more reactive than the noble gases but less reactive than other gases (e.g., hydrogen, methane, ethylene, acetylene, and other hydrocarbons) which are used in the carbon deposition process, the presence of nitrogen has been found to result in (1) higher conductivity of metal feedlines supplying the emitters with electron current, and (2) improvement of the morphology of the carbon films.

The conductivity of the metal feedlines, depending on the metal being used, decreases due to reaction with hydrogen or hydrocarbons at high temperatures. The deposition usually comprise three steps—substrate preheat, carbon growth, and purging. The resistivity of the feedlines increases already on the stage of the preheat, if this is done in hydrogen. Adding nitrogen to the gas mixture, or substituting hydrogen with nitrogen, significantly improves the electron transport properties of the feedlines. Reaction of hydrogen with feedlines leads also to a change in the adhesion between the feedlines and the layer of catalyst deposited on the feedlines. Nitrogen itself does not decrease the conductivity, but instead does not react with chromium at high temperatures as does hydrogen.

Figure 6:
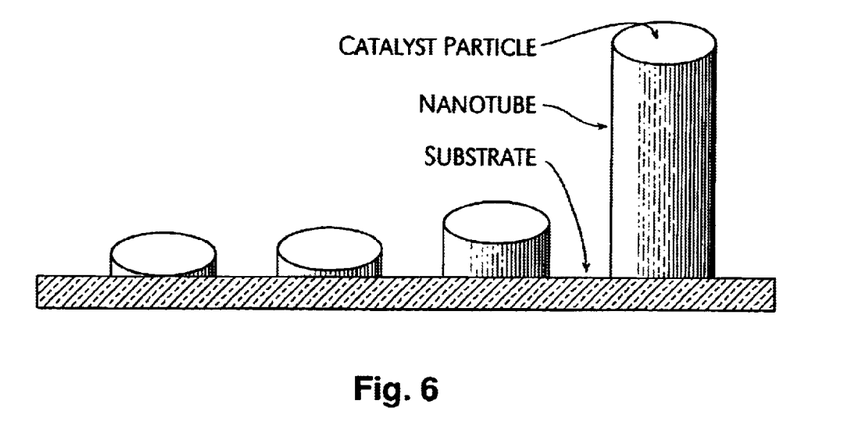
FIG. 6 illustrates growth of a nanotube.

Since the thermal CVD growth of carbon nanostructures requires the presence of nanoparticles of the catalyst (Ni with a promoter (copper); however, Co and Fe can be used as well), and these nanoparticles separate from the substrate as the carbon nanostructures lift these nanoparticles while the carbon grows (see FIG. 6), the adhesion of the catalyst nanoparticles to the feedlines influences the ability of carbon nanostructures to be formed in certain shapes (nanotubes, nanofibers, nanoflakes, or amorphous carbon).

The formation of a nanotube or fiber requires a separated particle of a catalyst. The size and, in less extent, the shape of the particle determines the diameter and structure of the nanotube or fiber. If nanoparticles cannot be formed with the required dimensions, e.g., if the adhesion of catalyst to a feedline is very strong, and the layer of the catalyst is very smooth and uniform, the conditions for formation of nanotubes are not satisfied since the catalyst nanoparticles are not formed. In an extreme case, on the polished surface of the bulk nickel the carbon grows in amorphous form.

It was also found that the addition of the nitrogen into the gas mixture results in moderation of the carbon growth, causing the nanotubes to form with higher aspect ratios. The hydrogen is more reactive in a CVD process. In the conditions favorable for nanotube growth, they will likely grow with large diameters and high surface density. This leads to the field screening effect and lower aspect ratios, affecting the field emission performance of the nanotubes. Adding the nitrogen moderates the growth so that nanotubes form thinner and/or with lower density. Field emission from the nanotubes with higher aspect ratios has lower threshold and working fields, which is a desired quality for a field emitter.

A sample cathode on Corning 1737F glass substrate was fabricated in tube furnace at 685° C., with backfill with hydrogen after air evacuation. The sequence of steps is as follows: loading the substrate in the front part of the deposition system (tube furnace); pumping down the air from the system, filling the system back with hydrogen to reach a required gas pressure-backfill; pulling the substrate to the deposition zone (nearly the center of the tube furnace). then preheat during a certain time, deposition during 5 minutes in the mixture of hydrogen and ethylene, and then purging with hydrogen. The resulting cathode had an electric field of 6.4 V/mm for the field emission current density of 1 mA/cm$^2$, and electric field of 9.3 V/mm for the current density of 10 mA/cm$^2$.

Another sample cathode on Corning 1737F glass substrate was fabricated in tube furnace at 685° C., with backfill with nitrogen after air evacuation, deposition during 5 minutes in the mixture of hydrogen and ethylene, and then purging with nitrogen. The purge is a step that removes the reaction gases, especially the carbon precursor, ethylene, from the active (substrate) area; without the purge, one would have to pull the substrate back to the front area of the tube, exposing the substrate to temperature gradients along the tube furnace, and still allowing carbon growth, however at the continuously decreasing temperature (the change in temperature affects the carbon growth). The resulting cathode in accordance with the present invention had an electric field of 4.1 V/mm for the field emission current density of 1 mA/cm$^2$, and electric field of 6.6 V/mm for the current density of 10 mA/cm$^2$.

Thus, a decrease of nearly 30% in the values of electric field needed to extract the electrons at the same current densities was observed.

Although the present invention and its advantages have been described in detail, it should be understood that various changes, substitutions and alterations can be made herein without departing from the spirit and scope of the invention as defined by the appended claims.

What is claimed is:

1. A cold emission cathode comprising:

a substrate; and a carbon nanotube emitter deposited over the substrate, wherein the carbon nanotube emitter includes nitrogen at a concentration of at least $10^{17}$ atoms per cubic centimeter.

2. A field emission display comprising:

an anode having a phosphor; and a cathode comprising a substrate with a carbon nanotube emitter deposited thereon, wherein the carbon nanotube emitter includes nitrogen at a concentration of at least $10^{17}$ atoms per cubic centimeter.

3. A data processing system comprising:

a processor;

a memory device;

an input device;

an output device;

a display device; and a bus system for coupling the processor to the memory device, input device, output device, and display device, wherein the display device further comprises an anode having a phosphor, and a cold cathode comprising a substrate with a carbon nanotube emitter deposited thereon, wherein the carbon nanotube emitter includes nitrogen at a concentration of at least $10^{17}$ atoms per cubic centimeter.

4. The cathode as recited in claim 1, wherein the concentration of nitrogen in the carbon nanotube emitter is less than $10^{21}$ atoms per cubic centimeter.

5. The display as recited in claim 2, wherein the concentration of nitrogen in the carbon nanotube emitter is less than $10^{21}$ atoms per cubic centimeter.

6. The system as recited in claim 3, wherein the concentration of nitrogen in the carbon nanotube emitter is less than $10^{21}$ atoms per cubic centimeter.

7. The cathode as recited in claim 1, wherein the nitrogen is present at an interface between the substrate and the carbon nanotube emitter to facilitate electron injection into the carbon nanotube emitter.

8. A method of growing carbon nanotubes in the presence of a quantity of nitrogen, wherein said nitrogen facilitates formation of carbon nanotubes having aspect ratios higher than those formed without the addition of nitrogen.

9. The method of claim 8, wherein the carbon nanotubes grown in the presence of nitrogen display enhanced field emission characteristics.

10. The method of claim 8, wherein the carbon nanotubes grown in the presence of nitrogen comprise an amount of nitrogen which ranges from at least about $10^{17}$ atoms per cubic centimeter to at most about $10^{21}$ atoms per cubic centimeter.

* * * * *